(12) United States Patent
Suh

(10) Patent No.: US 9,560,526 B2
(45) Date of Patent: Jan. 31, 2017

(54) METHOD AND APPARATUS FOR SINGLE SIGN-ON IN A MOBILE COMMUNICATION SYSTEM

(71) Applicant: Samsung Electronics Co., Ltd., Suwon-si, Gyeonggi-do (KR)

(72) Inventor: Kyung Joo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 14/349,221

(22) PCT Filed: Oct. 29, 2012

(86) PCT No.: PCT/KR2012/008950
§ 371 (c)(1),
(2) Date: Apr. 2, 2014

(87) PCT Pub. No.: WO2013/062394
PCT Pub. Date: May 2, 2013

(65) Prior Publication Data
US 2014/0235211 A1   Aug. 21, 2014

Related U.S. Application Data

(60) Provisional application No. 61/552,684, filed on Oct. 28, 2011.

(51) Int. Cl.
*H04W 12/06*   (2009.01)
*H04L 29/06*   (2006.01)
(Continued)

(52) U.S. Cl.
CPC .......... *H04W 12/06* (2013.01); *H04L 63/0815* (2013.01); *H04L 67/02* (2013.01); *H04W 4/00* (2013.01)

(58) Field of Classification Search
CPC ....... H04L 63/0815; H04L 67/02; H04W 4/00; H04W 12/06
(Continued)

(56) References Cited

U.S. PATENT DOCUMENTS

2010/0023962 A1   1/2010   Blommaert et al.
2011/0264913 A1   10/2011  Nikander et al.
2012/0204231 A1   8/2012   Holtmanns et al.

FOREIGN PATENT DOCUMENTS

KR   10-2007-0083345 A   8/2007
KR   10-2009-0067192 A   6/2009
(Continued)

OTHER PUBLICATIONS

3rd Generation Partnership Project; Technical Specification Group Services and System Aspects; Identity Management and 3GPP Security Interworking; Identity Management and Generic Authentication Architecture (GAA) Interworking (Release 10), 3GPP TR 33.924, Jun. 16, 2011, V10.1.0, 3GPP, Sophia Antipolis, France.

*Primary Examiner* — Erica Navar
(74) *Attorney, Agent, or Firm* — Jefferson IP Law, LLP

(57) ABSTRACT

The present invention relates to a method and an apparatus for single sign-on in a mobile communication system. A method in which a browsing agent performs single sign-on in a mobile communication system according to the present invention comprises: a step of transmitting user-supplied identifier to a relay party (RP); a step of receiving, from said RP, a message indicating that a browser should be redirected to said RP; a step of transmitting an identifier of an authentication agent to an open ID provider (OP)/network application function (NAF); and a step of transmitting, to the authentication agent, the identifier of the authentication agent or a message that triggers to make an inquiry into the identifier of the authentication agent. According to the
(Continued)

present invention, a single sign-on procedure may be performed in a safer manner.

6 Claims, 2 Drawing Sheets

(51) Int. Cl.
*H04W 4/00* (2009.01)
*H04L 29/08* (2006.01)

(58) Field of Classification Search
USPC .................................................. 455/410, 411
See application file for complete search history.

(56) References Cited

FOREIGN PATENT DOCUMENTS

| | | |
|---|---|---|
| KR | 10-2011-0048038 A | 5/2011 |
| WO | 2011/048551 A1 | 4/2011 |
| WO | 2011-100331 A1 | 8/2011 |
| WO | 2011/128183 A2 | 10/2011 |

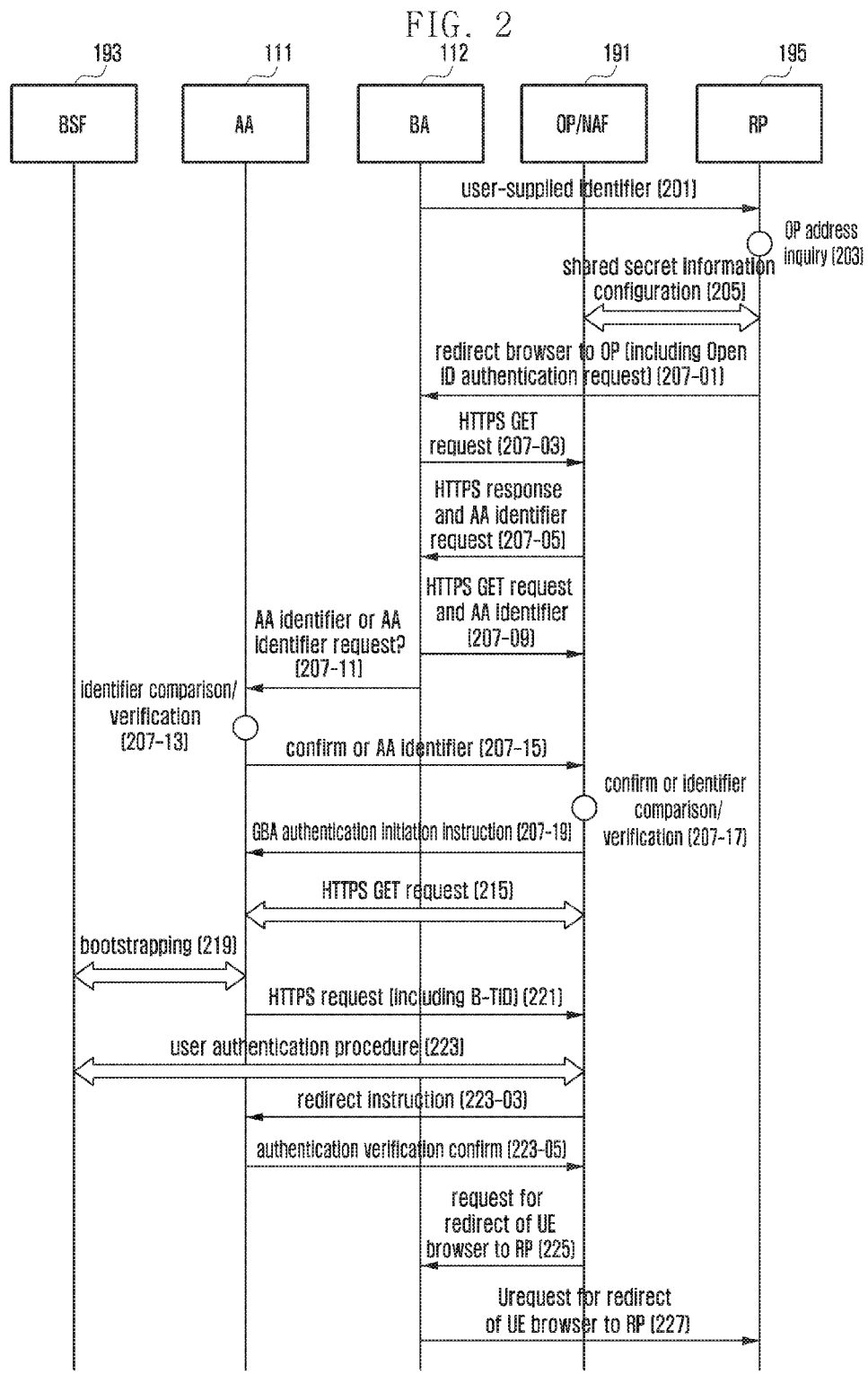

METHOD AND APPARATUS FOR SINGLE SIGN-ON IN A MOBILE COMMUNICATION SYSTEM

TECHNICAL FIELD

The present invention relates to a single sign-on method and apparatus for use in a mobile communication system and, in particular, to a method and apparatus for supporting the single sign-on procedure efficiently.

BACKGROUND ART

Single Sign-On (SSO) is an access control method which makes it possible for a user to logs in once and gains access all permitted resources. In the case of using SSO, the user can log in all available servers automatically using one user ID and password.

The conventional SSO method has security vulnerability in the ID transmission and authentication procedure for SSO. Such security vulnerability brings on fishing attack.

DISCLOSURE OF INVENTION

Technical Problem

The present invention has been conceived to solve the above problem and aims to solve the security problem which may occur in the SSO procedure in such a way of splitting up the sign-on procedure between Browsing Agent and Authentication Agent.

Solution to Problem

In accordance with an aspect of the present invention, a single sign-on method of a browsing agent in a mobile communication system includes transmitting an user-supplied identifier to a Relaying Party (RP), receiving, from the RP, a message instructing to redirect a browser to the RP, transmitting an identifier of an Authentication Agent to an Open ID provider (OP), and transmitting one of the identifier of the Authentication Agent and a message triggering inquiry of the identifier of Authentication Agent to the Authentication Agent.

In accordance with another aspect of the present invention, a single sign-on method of an Authentication Agent in a mobile communication system includes receiving an identifier of the Authentication Agent from a Browsing Agent, determining whether the identifier of the Authentication Agent matches a user-supplied identifier, and transmitting, when the identifier of the Authentication Agent matches the user-supplied identifier, a confirm message to an Open ID Provider/Network Application Function (OP/NAF).

In accordance with another aspect of the present invention, a single sign-on method of an Authentication Agent in a mobile communication system includes receiving a message triggering inquiry of an identifier of the Authentication Agent from a Browsing Agent and transmitting a user-supplied identifier to an Open ID Provider/Network Application Function (OP/NAF).

In accordance with another aspect of the present invention, a single sign-on apparatus of a Browsing Agent in a mobile communication system includes a controller which controls transmitting an user-supplied identifier to a Relaying Party (RP), receiving, from the RP, a message instructing to redirect a browser to the RP, transmitting an identifier of an Authentication Agent to an Open ID provider (OP), and transmitting one of the identifier of the Authentication Agent and a message triggering inquiry of the identifier of Authentication Agent to the Authentication Agent.

In accordance with another aspect of the present invention, a single sign-on apparatus of an Authentication Agent in a mobile communication system includes a controller which controls receiving an identifier of the Authentication Agent from a Browsing Agent, determining whether the identifier of the Authentication Agent matches a user-supplied identifier, and transmitting, when the identifier of the Authentication Agent matches the user-supplied identifier, a confirm message to an Open ID Provider/Network Application Function (OP/NAF).

In accordance with still another aspect of the present disclosure, a single sign-on apparatus of an Authentication Agent in a mobile communication system includes a controller which controls receiving a message triggering inquiry of an identifier of the Authentication Agent from a Browsing Agent and transmitting a user-supplied identifier to an Open ID Provider/Network Application Function (OP/NAF).

Advantageous Effects of Invention

The present invention is advantageous in facilitating SSO procedure securely.

BRIEF DESCRIPTION OF DRAWINGS

FIG. 2 is a signal flow diagram illustrating an SSO procedure according to an embodiment of the present invention.

MODE FOR THE INVENTION

Figure 1:
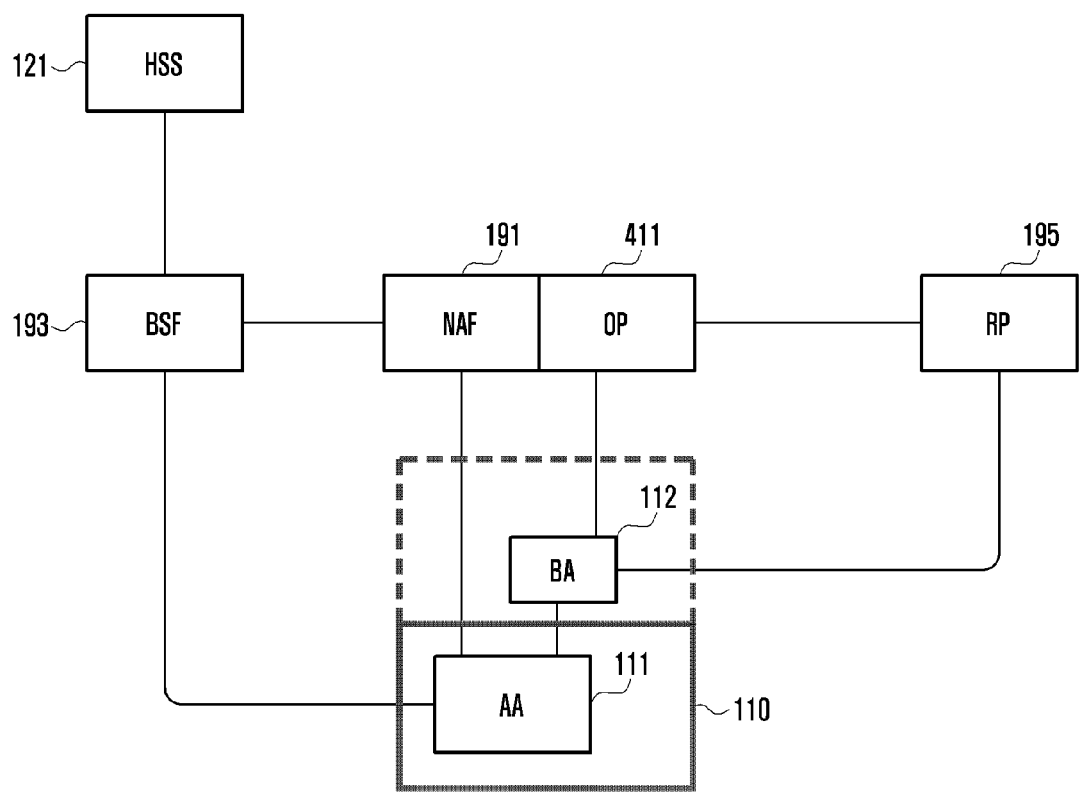
FIG. 1 is a block diagram illustrating an exemplary SSO mechanism in the mobile communication system environment according to an embodiment of the present invention.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

The present invention proposes a secure SSO procedure in the mobile communication system environment. Although the description is directed to the 3GPP-based Evolved Packet System (EPS), Universal Terrestrial Radio Access Network (UTRAN), Evolved UTRAN (EUTRAN), GSM/Edge Radio Access Network (GERAN), the present disclosure is not limited thereto but applicable to other types of mobile communication system. The procedure of processing the SSO-related information may be modified variously without departing from the scope of the present invention.

Also, the present invention proposes an SSO procedure for communication between the terminal and the network in the evolved mobile communication system such as 3GPP EPS supporting Generic Bootstrapping Architecture and related protocol, security protocols, and Open ID. This procedure may be modified variously without departing from the scope of the present invention.

FIG. 1 is a block diagram illustrating an exemplary SSO mechanism in the mobile communication system environment according to an embodiment of the present invention.

FIG. 1 is a block diagram illustrating an exemplary SSO mechanism in the mobile communication system environment according to an embodiment of the present invention.

The drawing is directed to the 3GPP EPS system structure as an example. Although the description is directed to the E-UTRAN, the present invention can be applied to similar types of mobile communication systems.

Referring to FIG. 1, the terminal (hereinafter, referred to as User Equipment or UE) 110 may establish a radio connection with the base station for communication. The UE 110 may connect a packet data network such as Internet via Serving Gateway (hereinafter, referred to as Serving GW or SGW).

The UE 110 may include a Mobile Equipment (ME) and a Subscriber Identification Module (SIM). The ME may perform operations in association with the user or network.

The SIM stores and manages user's subscription information and security information.

According to an embodiment of the present invention, the UE 110 may include two entities for SSO. That is, the UE 110 may include an Authentication Agent (AA) 111 and a Browsing Agent (BA) 112. At this time, the AA 111 and BA 112 may not be included in the same entity physically. That is, AA 111 may include in the ME of the UE 110 while the BA 112 is included in a physically separate entity.

The Home Subscriber Server (HSS) 121 may manage the user and UE authentication information and service information. The HSS 121 may include a Home Location Register (HLR) and Authentication Center (AUC).

The Bootstrapping Server Function (BSF) 193 may participate in the bootstrapping procedure for configuring a normal bootstrapping architecture.

The Network Application Function (NAF) 191 may execute an application. The NAF 191 may include an OpenID Provider (OP).

The Relaying Party (RP) 195 is an entity participating in the SSO procedure. The RP 195 includes a web application requiring evidence on that the user uses an identifier.

The OP is an entity acting as an open ID authentication server function.

This embodiment proposes a method for the network entities including UE 110, AA 111, BA 112, HSS 121, BSF 193, NAF/OP 191, and RP 195 to execute SSO of the user more securely.

Each of the UE 110, AA 111, BA 112, HSS 121, BSF 193, NAF/OP 191, and RP 195 includes a transceiver for transmitting/receiving data among each other and a controller which makes a determination based on the data received by the transceiver and controls the transceiver to transmit/receive the determination result.

Although the embodiment of FIG. 1 of the present invention proposes the SSO procedure of the UE in the E-UTRAN or 3GPP environment, it will be understood by those skilled in the art that the present invention can be applied even to other communication systems having the similar technical background, channel format, network architecture, and similar protocol of protocols different but operating in similar way, with a slight modification, without departing from the spirit and scope of the present invention.

FIG. 2 is a signal flow diagram illustrating an SSO procedure according to an embodiment of the present invention.

Referring to FIGS. 1 and 2, the BA 112 transmits a signal including user-provided identifier to the RP 195 using a browser at step 201. At step 203, the RP 195 inquires the address of the OP 191 based on the signal received at step 201. The OP 191 may include NAF. At operation 205, the RP 195 may configure shared secret information with OP/NAF 195 inquired at step 203.

A description is made of the SSO procedure and user authentication procedure through AA 111 and BA 112 at steps 207-01 to 207-19.

At step 207-01, the RP 195 transmits a message including the information instructing to redirect the browser of the BA 112 to OP 191 at step 205. The message may include an Open ID authentication request. At this time, the Open ID operation indicator may be transmitted together, and the indicator may be used in the procedure where the BA 112 selects an appropriate OP/NAF or in the OP/NAF operation procedure.

The BA 112 receives a message instructing to redirect and then sends an HTTPS GET request message to the OP/NAF 191 at step 207-03. If the HTTPS GET request message is received, the OP/NAF 191 sends the BA 112 an HTTPS response inquiring the identifier of the AA 111 at step 207-05. Afterward, the BA 112 may send the OP/NAF 191 the identifier of the AA 111 and HTTPS GET request at step 207-09.

A description is made of the authentication procedure according to various embodiments at steps 207-11 to 207-19.

According to the first embodiment of the present disclosure, the BA 112 may send the AA 111 the AA identifier at step 207-11. At this time, the identifier may be a user-supplied identifier. At step 207-13, the AA 111 compares the AA identifier received from the BA 112 at step 207-11 with the user identifier transmitted from the BA 112 to the RP 195 at step 201 or verifies the information for authentication. At this time, if the BA 112 is implemented as an entity physically separated from the AA 111, the BA 112 may receive the user-provided identifier from the AA 111 before step 207-11. If the authentication is successful, the AA 111 sends the OP/NAF 191 a confirm message at step 207-15.

According to the second embodiment of the present invention, the BA 112 may send the AA 111 a message triggering inquiry of the identifier of the AA at step 207-11. The AA 111 sends the OP/NAF 191 the user-supplied identifier as the identifier of the AA at step 207-15. The OP/NAF 191 may compare the received AA identifier with the identifier of the AA which is received from the BA 112 or verify the identifier for authentication at step 207-17.

According to the third embodiment of the present invention, the BA 112 sends the AA 111 a message triggering inquiry of the identifier of the AA at step 207-11. The AA 111 may send the OP/NAF 191 at least one of bootstrapping transaction identifier (B-TID) and user-supplied identifier included in the AA identifier at step 207-15. The OP/NAF 191 compares the received AA identifier or B-TID with the AA identifier received from the BA 112 or verifies the identifier for authentication at step 207-17.

According to the fourth embodiment of the present invention, the BA 112 sends the AA 111 a message triggering inquiry of the identifier of AA at step 207-11. The AA 111 sends the OP/NAF 191 at least one of Mobile Station Integrated Services Digital Number (MSISDN) and user-supplied identifier included in the AA identifier at step 207-15. The OP/NAF 191 compares the received AA identifier or Mobile Station Integrated Services Digital Number (MSISDN) with the AA identifier received from the BA 112 or verifies the identifier for authentication at step 207-17.

The OP/NAF 191 may perform the operation of initiating the authentication procedure using Generic Bootstrapping Architecture (GBA) to the AA 111 at step 207-19.

The AA 111 sends the OP 191 an HTTPS GET message at step 215, and the NAF starts UE authentication procedure based on the HTTPS GET message at step 217.

The AA 111 performs the bootstrapping procedure with the BSF 193 at step 219 and sends the OP/NAF 191 the HTTPS request message including the bootstrapping transaction identifier (B-TID) at step 221.

At step 223, the OP/NAF 191 and BSF 193 perform a user authentication procedure based on the message transmitted at step 211. The NAF/OP 191 may send the AA 111 a message notifying of redirecting the browser to the RP 195 via the BA at step 223-03. Afterward, the AA 111 sends the OP/NAF 191 an authentication confirm message at step 223-05.

The OP/NAF 191 sends the BA 112 the message notifying of redirecting the browser to the RP 195 at step 225. At this time, a message instructing to transmit the authentication confirm message together may be transmitted. The BA 112 redirects the browser to the RP 195 at step 227 and, at this time, the authentication confirm message can be transmitted together.

Although the description has been made with reference to particular embodiments, the present invention can be implemented with various modifications without departing from the scope of the present invention. Thus, the present invention is not limited to the particular embodiments disclosed but will include the following claims and their equivalents.

The invention claimed is:

1. An authentication method for a single sign-on by a browsing agent in a mobile communication system, the method comprising:
   transmitting an user-supplied identifier to a relaying party (RP);
   receiving, from the RP, a message instructing to redirect a browser to the RP; and
   transmitting one of an identifier of the authentication agent and a message triggering inquiry of the identifier of the authentication agent to the authentication agent,
   wherein the identifier of the authentication agent is transmitted from the authentication agent to an open ID provider/network application function (OP/NAF), if the browsing agent transmits the message triggering the inquiry,
   wherein the identifier of the authentication agent is used for first authentication procedure, and
   wherein the user-supplied identifier and the identifier of the authentication agent are used to determine whether to initiate a second authentication procedure using generic bootstrapping architecture (GBA) with the authentication agent.

2. The method of claim 1, further comprising:
   receiving a message instructing to redirect the browser to the OP from the OP/NAF; and
   redirecting the browser to the OP.

3. The method of claim 1, wherein the transmitting of the identifier of the authentication agent comprises:
   transmitting an HTTPS GET request to the OP/NAF;
   receiving an HTTPS response requesting for the identifier of the authentication agent from the OP/NAF in response to the HTTPS GET request; and
   transmitting the identifier of the Authentication Agent and the HTTP GET request to the OP/NAF.

4. A browsing agent for single sign-on in a mobile communication system, the browsing agent comprising:
   a controller configured to:
      transmit a user-supplied identifier to a relaying party (RP),
      receive, from the RP, a message instructing to redirect a browser to an open ID provider (OP), and
      transmit one of an identifier of the authentication agent and a message triggering inquiry of the identifier of the authentication agent to the authentication agent,
      wherein the identifier of the authentication agent is transmitted from the authentication agent to an open ID provider/network application function (OP/NAF), if the browsing agent transmits the message triggering the inquiry,
      wherein the identifier of the authentication agent is used for first authentication procedure, and
      wherein the user-supplied identifier and the identifier of the authentication agent are used to determine whether to initiate a second authentication procedure using generic bootstrapping architecture (GBA) with the authentication agent.

5. The browsing agent of claim 4, wherein the controller is further configured to receive a message instructing to redirect the browser to the OP from the OP/NAF, and redirect the browser to the OP.

6. The browsing agent of claim 4, wherein the controller is further configured to:
   transmit an HTTPS GET request to the OP/NAF,
   receive an HTTPS response requesting for the identifier of the authentication agent from the OP/NAF in response to the HTTPS GET request, and
   transmit the identifier of the authentication agent and the HTTP GET request to the OP/NAF.

* * * * *